No. 719,229. PATENTED JAN. 27, 1903.
H. G. KEASBEY.
FEED WATER HEATER.
APPLICATION FILED JULY 3, 1901.
NO MODEL. 2 SHEETS—SHEET 1.
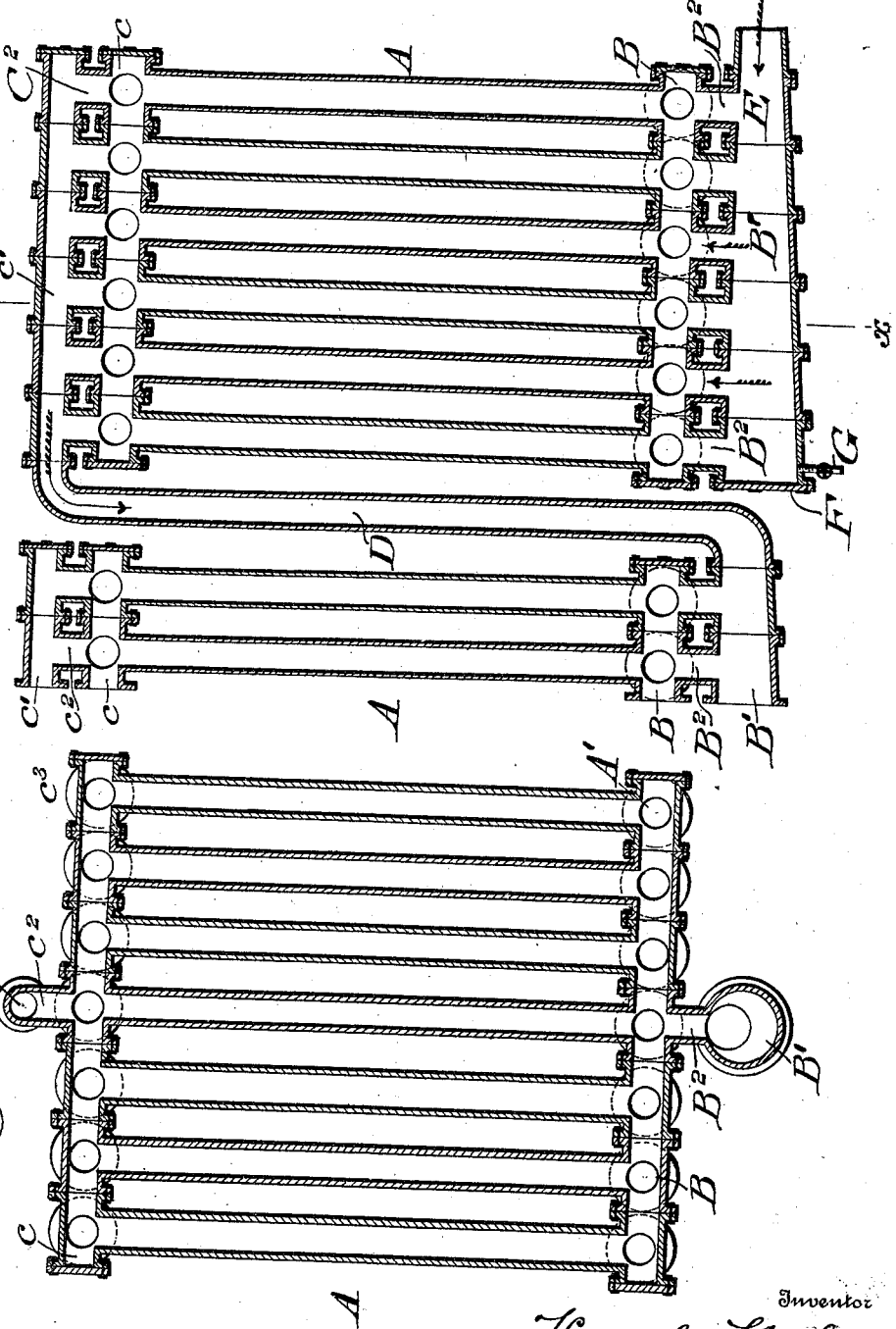

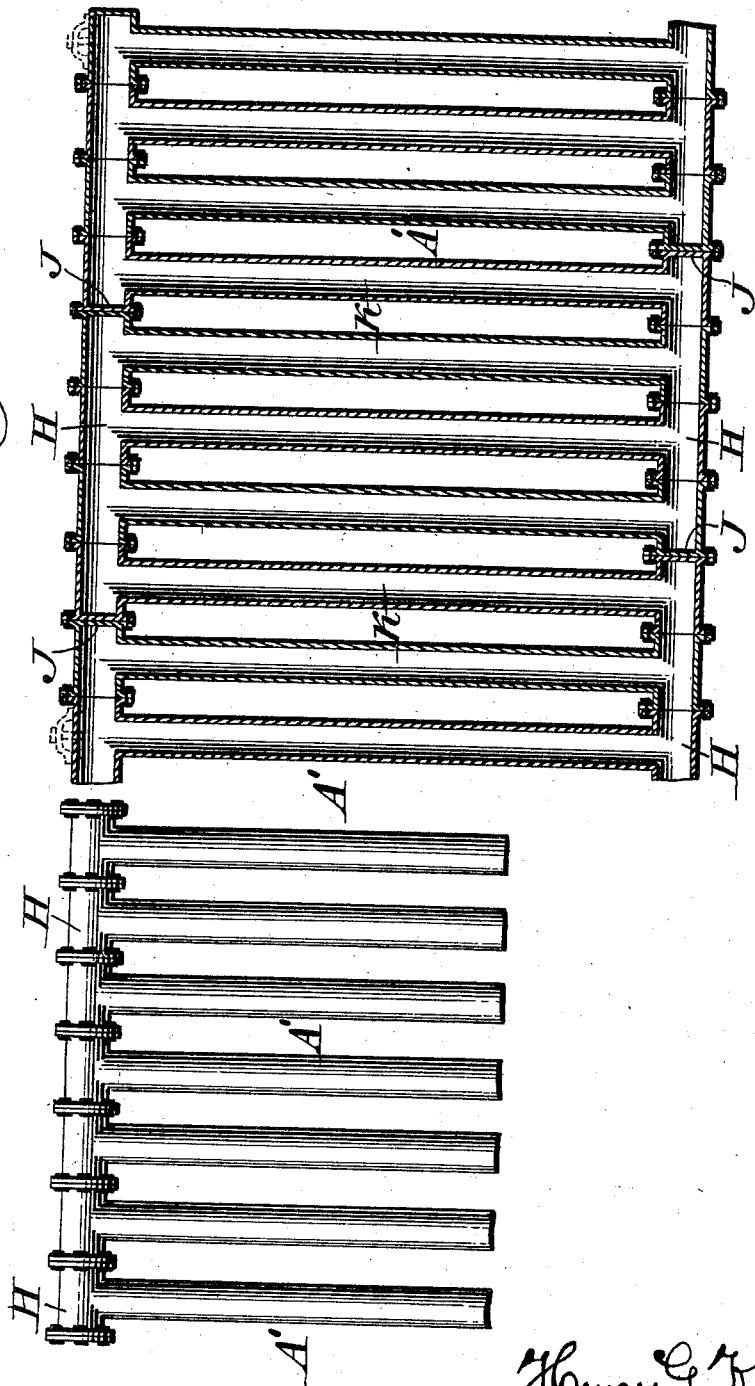

UNITED STATES PATENT OFFICE.

HENRY G. KEASBEY, OF PHILADELPHIA, PENNSYLVANIA.

FEED-WATER HEATER.

SPECIFICATION forming part of Letters Patent No. 719,229, dated January 27, 1903.

Application filed July 3, 1901. Serial No. 66,947. (No model.)

*To all whom it may concern:*

Be it known that I, HENRY G. KEASBEY, a citizen of the United States, residing in the city and county of Philadelphia, State of Pennsylvania, have invented a new and useful Improvement in Feed-Water Heaters and Fuel-Economizers, of which the following is a specification.

My invention consists of the novel construction of a feed-water heater and fuel-economizer, the same embodying a series of tubes or pipes arranged in vertical direction and transverse boxes or chambers connected with said tubes at the upper and lower ends thereof, said parts being assembled to form a battery, a number of which is employed, one being connected with the other in such manner that the feed-water is compelled to flow from the upper part of one battery to the lower part of the adjacent one and in the direction contrary to the products of combustion from the boiler-furnace, whereby water that is at the point of its highest temperature in each battery or series is conveyed from that battery to the part of the adjacent one where the water is at the lowest temperature, and so on to the boiler, thus effectively heating the water.

Figure 1 represents a longitudinal section of a feed-water heater and fuel-economizer embodying my invention. Fig. 2 represents a transverse section thereof on line $x\,x$, Fig. 1. Fig. 3 represents a longitudinal section of a modification. Fig. 4 represents an end view thereof.

Similar letters of reference indicate corresponding parts in the figures.

Referring to the drawings, A designates a series of vertically-arranged tubes which rise from the transversely-extending cylinders or boxes B and are connected at top with the transversely-arranged cylinders or boxes C. Below the boxes B is the manifolding-pipe B', between which parts are the branches or necks $B^2$, which form communications between said pipe and boxes. Above the boxes C is the manifolding-pipe C', between which parts are the branches or necks $C^2$, which form communications between said pipe and boxes, all of said parts being properly bolted or otherwise secured and constituting a section. A number of sections thus formed produce batteries, the adjacent ones of which are connected by the pipes D, it being noticed that each pipe extends from the upper pipe C' of one battery to the lower pipe B' of the adjacent battery, whereby water is caused to circulate from one battery to the other, it being noticed that the lower boxes of the first battery are provided with the feed-pipe E, the operation being as follows: The water enters the lower manifolding-pipe B' through the inlet-pipe E, passes through the necks or pipes $B^2$, and enters the boxes B, and from thence it enters the vertical tubes A, where it becomes heated and enters the upper boxes C and passes through the necks or pipes $C^2$ and enters the upper manifolding-pipe C', after which it reaches the circulating-pipe D and is directed by the same downward to the lower manifolding-pipe of the adjacent battery, from whence it again rises into the upper manifolding-pipe of the second battery, whereby it is still further heated, after which it descends to the third battery, where it is again further heated, and so on to the boiler, it being seen that the feed-water is compelled to pass in a devious course through each battery in a direction contrary to that traversed by the products of combustion from the boiler to the chimney, whereby the water is effectively heated, the products of combustion of the boiler-furnace being utilized for that purpose.

The lower manifolding-pipes B' are of somewhat larger diameter than the upper ones and conical in shape, thus forming chambers where the feed-water may come to rest and deposit impurities contained therein, said pipes having at their largest ends the closures F, which are held in place by bolts or other means, adapting the same to be removed for admission to the interior of said pipes, &c., for blowing out sediment.

G designates a blow-off pipe which may be employed. In Figs. 3 and 4 I show vertical tubes A' terminating at top and bottom with the horizontal boxes or chambers H. At intervals said boxes are divided by the diaphragms J, thus intercepting the flow of the feed-water.

At the end of each section are flues or passages K, which communicate with the top chamber of one section and the bottom chamber of the adjacent section, by which provision the water from the bottom chamber ascends the various tubes A' and enters the upper chamber H and is deflected by the diaphragms J into the passage K and so directed to the bottom chamber of the adjacent section.

Having thus described my invention, what I claim as new, and desire to secure by Letters Patent, is—

1. In a feed-water heater and fuel-economizer, batteries, each composed of a series of vertical tubes, longitudinally and transversely extending communicating boxes at the top and bottom thereof, a manifolding-pipe communicating with the bottom box, and a water-supply, a manifolding-pipe communicating with the upper box, and a conveying-pipe leading from the upper manifolding-pipe of one battery to the lower manifolding-pipe of the adjacent battery.

2. In a feed-water heater and fuel-economizer, a battery, each section of which is composed of a series of vertical tubes, boxes at the top and bottom thereof, horizontal tubes extending from one box to the other and forming communications between the several boxes respectively at the top and bottom, a manifolding-pipe communicating with one of said boxes and a water-supply, and a manifolding-pipe communicating with the other box, in combination with a conveying-pipe leading from the upper box of one section to the bottom box of the adjacent section.

3. In a feed-water heater, batteries each composed of a series of tubes, distributing-boxes at the opposite ends thereof, necks connected with said boxes, manifolding-pipes connected with the respective sets of said necks, a supply-pipe for one of said manifolding-pipes, and a discharge-pipe for the other manifolding-pipe, said discharge-pipe extending downwardly from the upper manifold of one battery to the lower manifold of the adjacent battery.

HENRY G. KEASBEY.

Witnesses:
JOHN A. WIEDERSHEIM,
C. D. McVAY.